(12) United States Patent
Krüger et al.

(10) Patent No.: US 10,094,114 B2
(45) Date of Patent: Oct. 9, 2018

(54) INSTALLATION FOR PRODUCING REINFORCEMENT CAGES FOR TOWER SEGMENTS OF WIND TURBINES

(71) Applicant: Wobben Properties GmbH, Aurich (DE)

(72) Inventors: Georg Krüger, Emden (DE); Ingo Meyer, Wiesmoor (DE); Karsten Albers, Hinte (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 15/101,848

(22) PCT Filed: Oct. 16, 2014

(86) PCT No.: PCT/EP2014/072205
§ 371 (c)(1),
(2) Date: Jun. 3, 2016

(87) PCT Pub. No.: WO2015/082115
PCT Pub. Date: Jun. 11, 2015

(65) Prior Publication Data
US 2016/0305125 A1     Oct. 20, 2016

(30) Foreign Application Priority Data

Dec. 5, 2013  (DE) .................. 10 2013 225 049

(51) Int. Cl.
*B21F 27/10*     (2006.01)
*E04C 5/06*     (2006.01)
(Continued)

(52) U.S. Cl.
CPC ............ *E04C 5/0609* (2013.01); *B21F 23/00* (2013.01); *B21F 27/10* (2013.01); *B21F 27/124* (2013.01);
(Continued)

(58) Field of Classification Search
CPC .. Y10T 29/5187; B21F 27/124; B21F 27/122; B21F 27/12; B21F 27/10; B21F 27/121
(Continued)

(56) References Cited

U.S. PATENT DOCUMENTS 2,050,832 A * 8/1936 Edwards ............... B21F 27/124
                                                        140/112
3,125,132 A * 3/1964 Knisely ................ B21F 27/124
                                                        140/112
(Continued)

FOREIGN PATENT DOCUMENTS

CN          101700555 A      5/2010
CN          201552575 U      8/2010
(Continued)

OTHER PUBLICATIONS

Machine translation of DE 3634736 A1, which DE '736 was published Apr. 1988.*

*Primary Examiner* — Erica E Cadugan
(74) *Attorney, Agent, or Firm* — Seed Intellectual Property Law Group LLP

(57) ABSTRACT

A system for producing reinforcing cages for wind turbine tower segments, wherein a reinforcing cage has in each case substantially horizontally oriented ring segments and substantially vertically oriented stiffening elements. It is proposed that the system has a receiving area which is adapted so as to receive the preferably inner, substantially horizontally oriented ring segments of the reinforcing cage, a first handling robot for supplying and positioning the stiffening elements, and a second handling robot for connecting the ring elements to the stiffening elements.

14 Claims, 17 Drawing Sheets

(51) Int. Cl.
  *B25J 9/00*   (2006.01)
  *B21F 27/12*  (2006.01)
  *F03D 13/20*  (2016.01)
  *B25J 9/16*   (2006.01)
  *E04H 12/12*  (2006.01)
  *F03D 13/10*  (2016.01)
  *B21F 23/00*  (2006.01)
  *B23K 101/04* (2006.01)
  *B23K 101/32* (2006.01)
  *E04H 12/34*  (2006.01)

(52) U.S. Cl.
  CPC ........... *B21F 27/125* (2013.01); *B25J 9/1682* (2013.01); *B25J 9/1687* (2013.01); *E04C 5/0618* (2013.01); *E04H 12/12* (2013.01); *F03D 13/10* (2016.05); *F03D 13/20* (2016.05); *B23K 2201/04* (2013.01); *B23K 2201/32* (2013.01); *E04H 12/341* (2013.01); *F05B 2230/238* (2013.01); *F05B 2230/61* (2013.01); *F05B 2240/912* (2013.01); *Y02E 10/728* (2013.01); *Y02P 70/523* (2015.11); *Y10T 29/49632* (2015.01); *Y10T 29/5187* (2015.01)

(58) Field of Classification Search
  USPC ....... 140/112, 92.1, 92.2, 111, 113; 29/33 F; 219/56
  See application file for complete search history.

(56) References Cited

U.S. PATENT DOCUMENTS

| | | | | |
|---|---|---|---|---|
| 3,280,855 | A | * | 10/1966 | Magers, Jr. ........... B21F 27/124 140/102 |
| 3,310,074 | A | * | 3/1967 | Huck ................... B21F 27/124 140/112 |
| 4,018,251 | A | | 4/1977 | Mündel et al. |
| 4,478,260 | A | * | 10/1984 | Eichler .................. A01G 23/04 140/112 |
| 6,148,873 | A | | 11/2000 | Mehre |
| 2015/0314994 | A1 | | 11/2015 | Meyer |

FOREIGN PATENT DOCUMENTS

| | | | |
|---|---|---|---|
| CN | 201880834 U | | 6/2011 |
| DE | 1552131 A1 | * | 8/1969 |
| DE | 24 32 855 A1 | | 1/1976 |
| DE | 36 34 736 A1 | | 4/1988 |
| DE | 38 09 420 C1 | | 8/1989 |
| DE | 91 17 259 U1 | | 8/1998 |
| DE | 198 14 091 A1 | | 10/1999 |
| DE | 198 30 414 B4 | | 2/2004 |
| DE | 10 2012 221 453 A1 | | 5/2014 |
| EP | 0 530 138 A1 | | 3/1993 |
| EP | 0 947 257 A2 | | 10/1999 |
| EP | 0 947 257 A3 | | 10/2000 |
| NL | 1030978 C2 | | 7/2007 |
| WO | WO-2016/063221 A1 | * | 4/2016 |

* cited by examiner

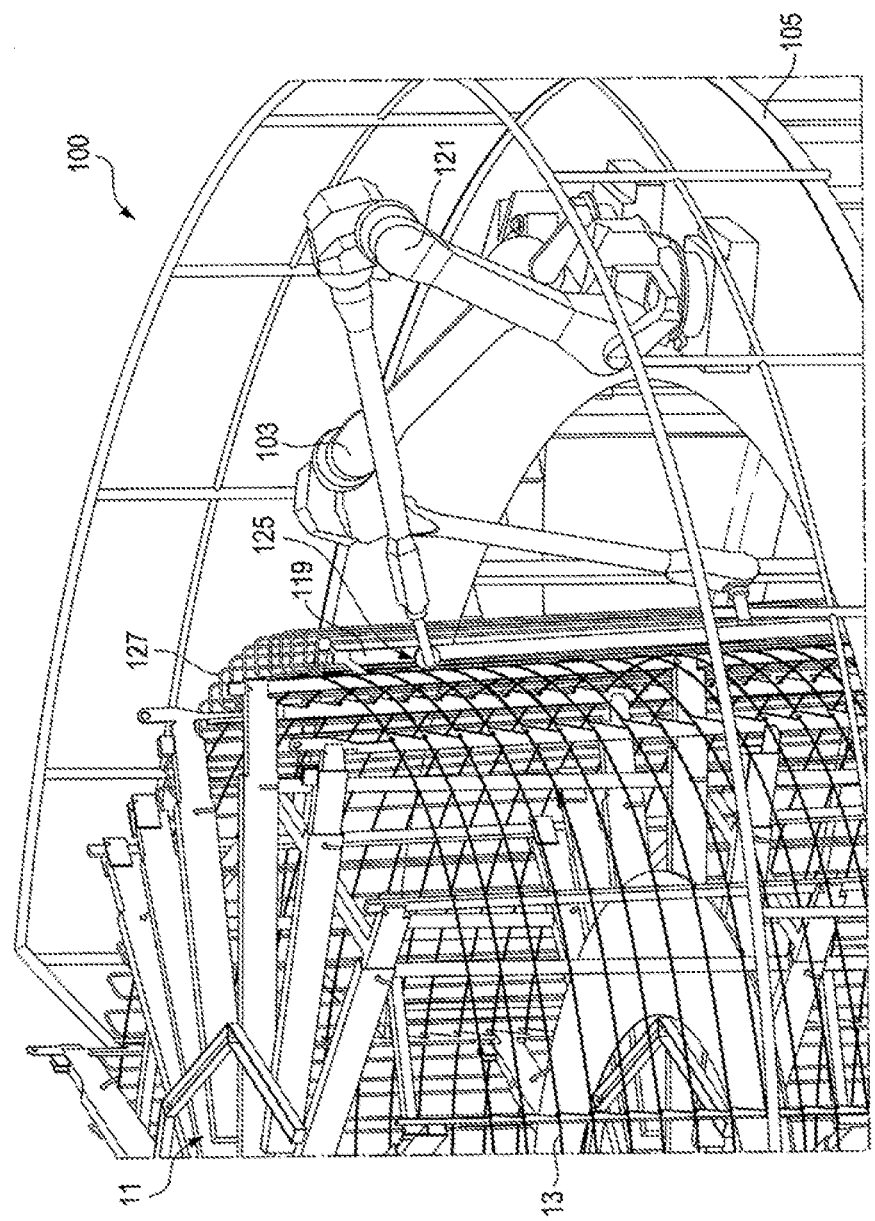

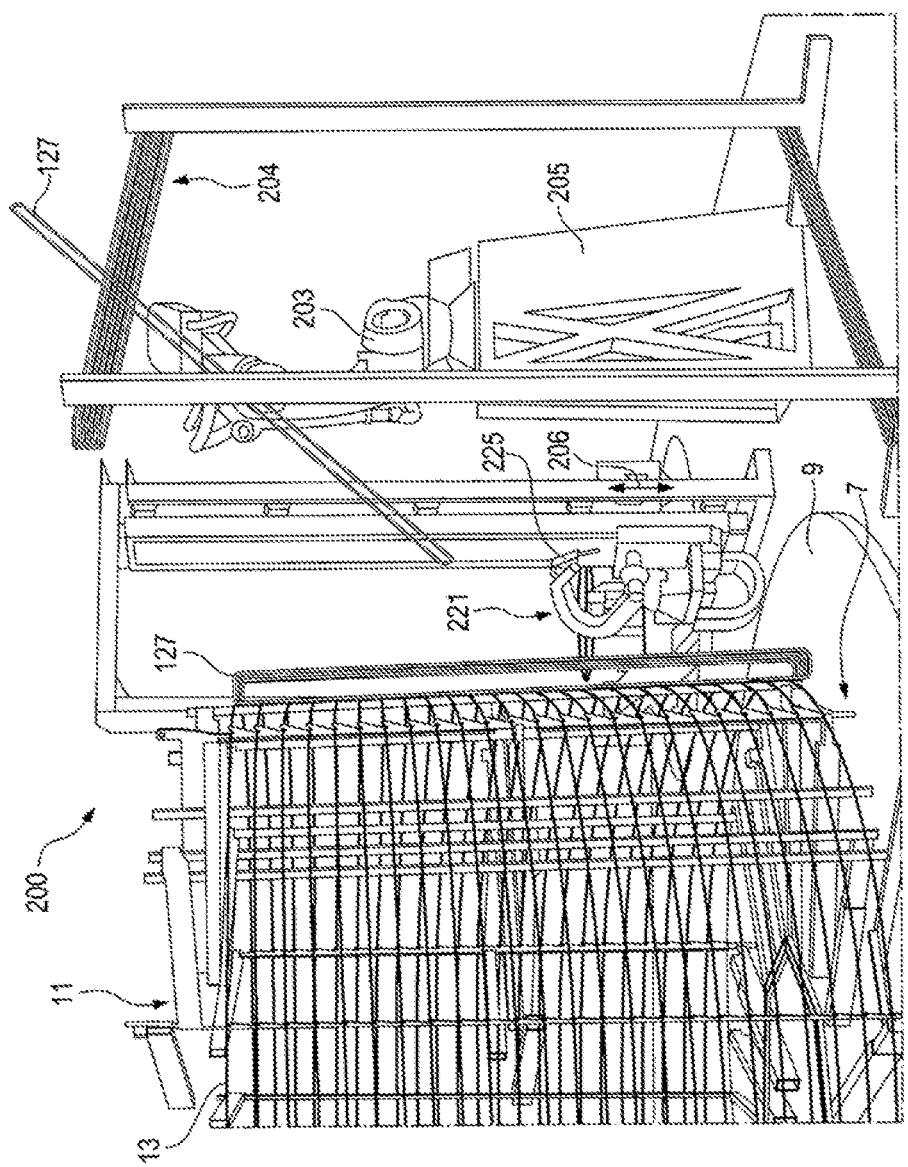

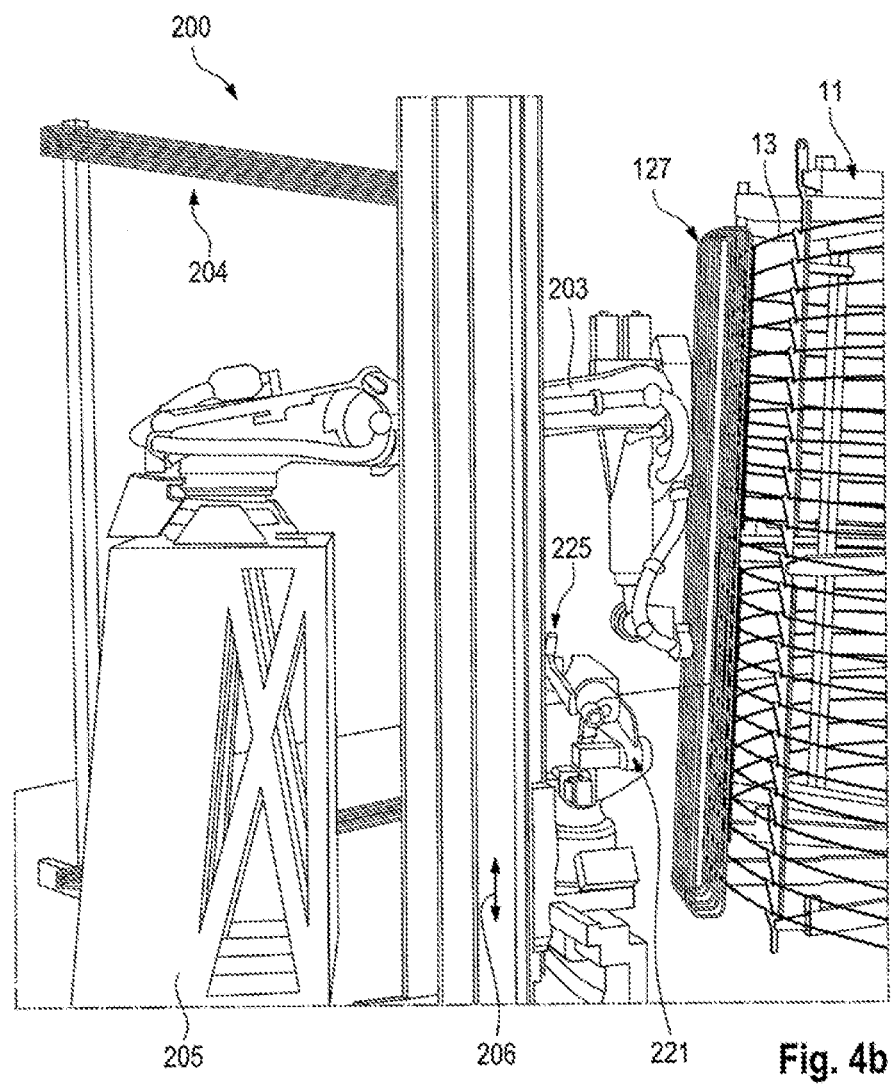

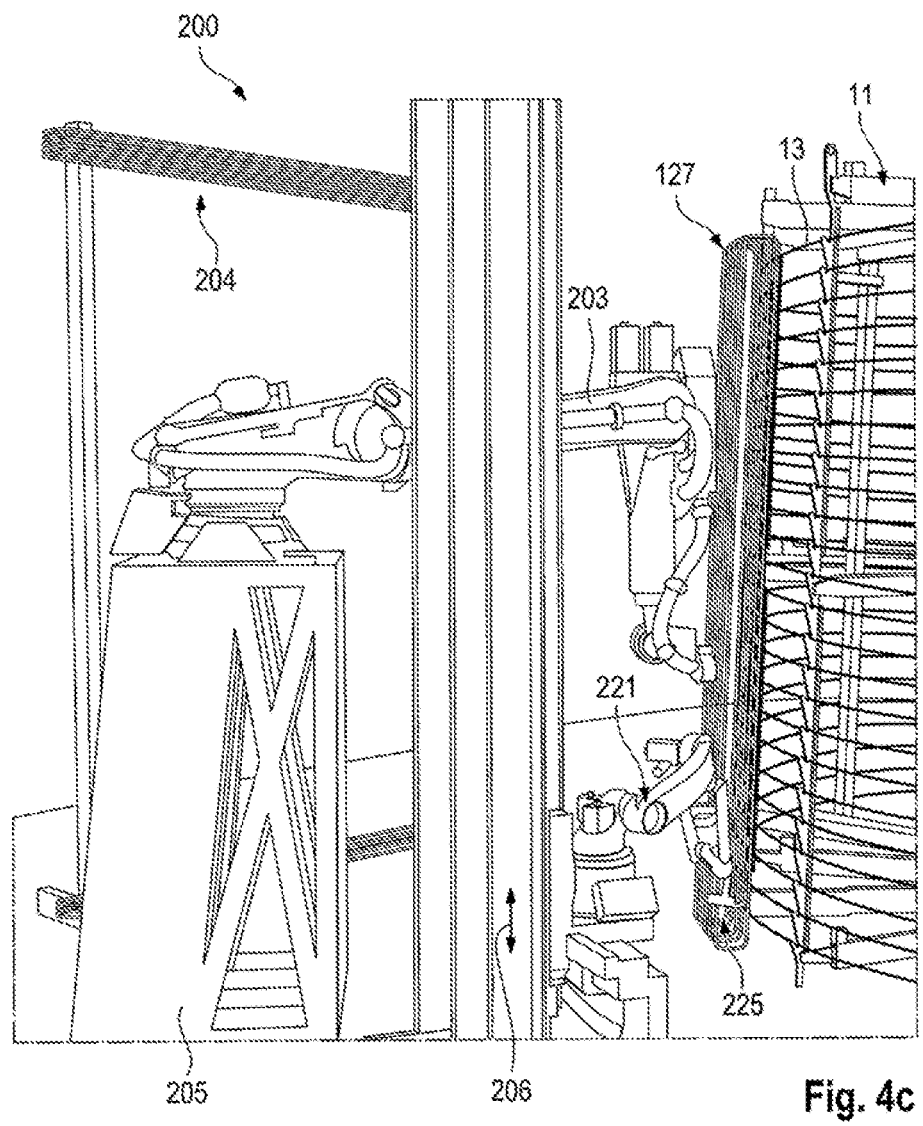

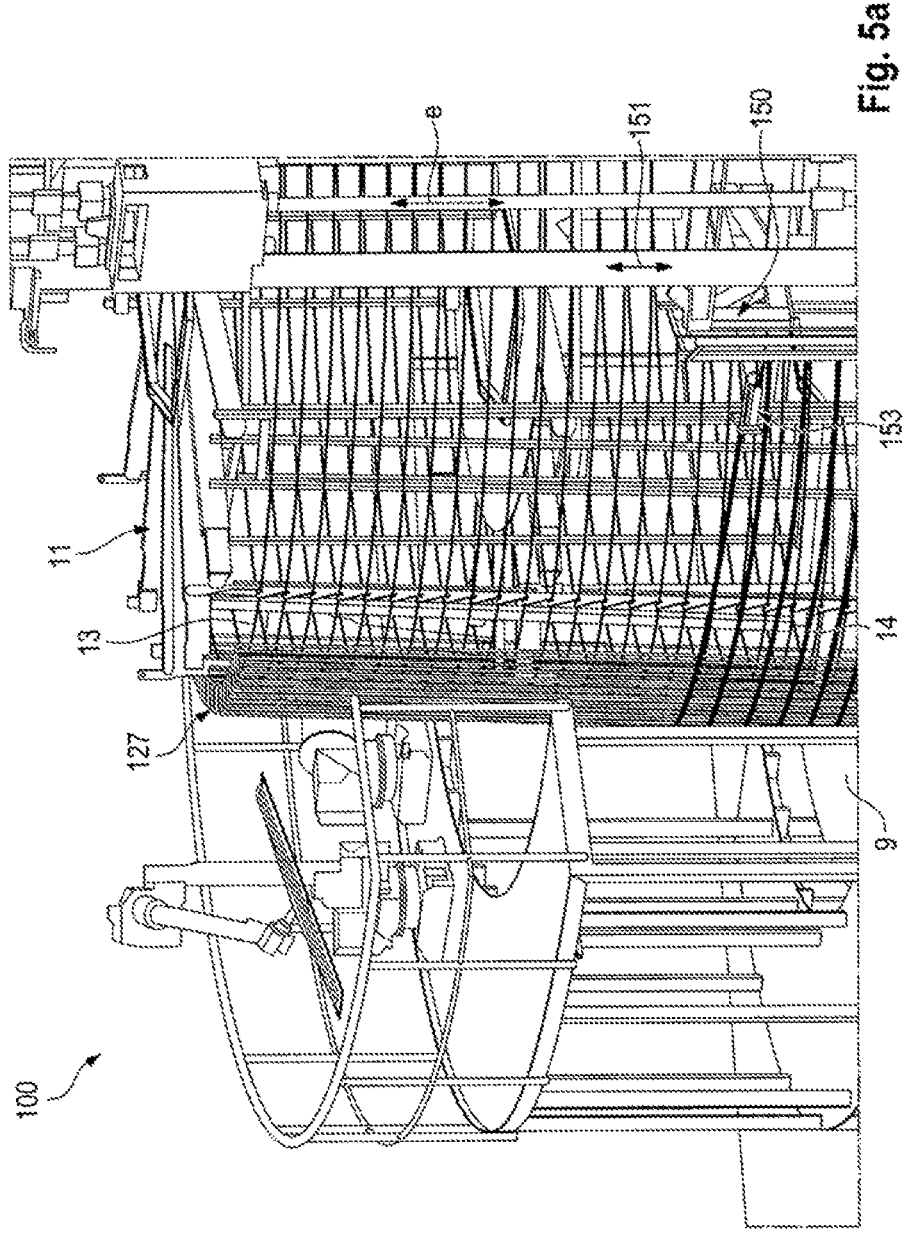

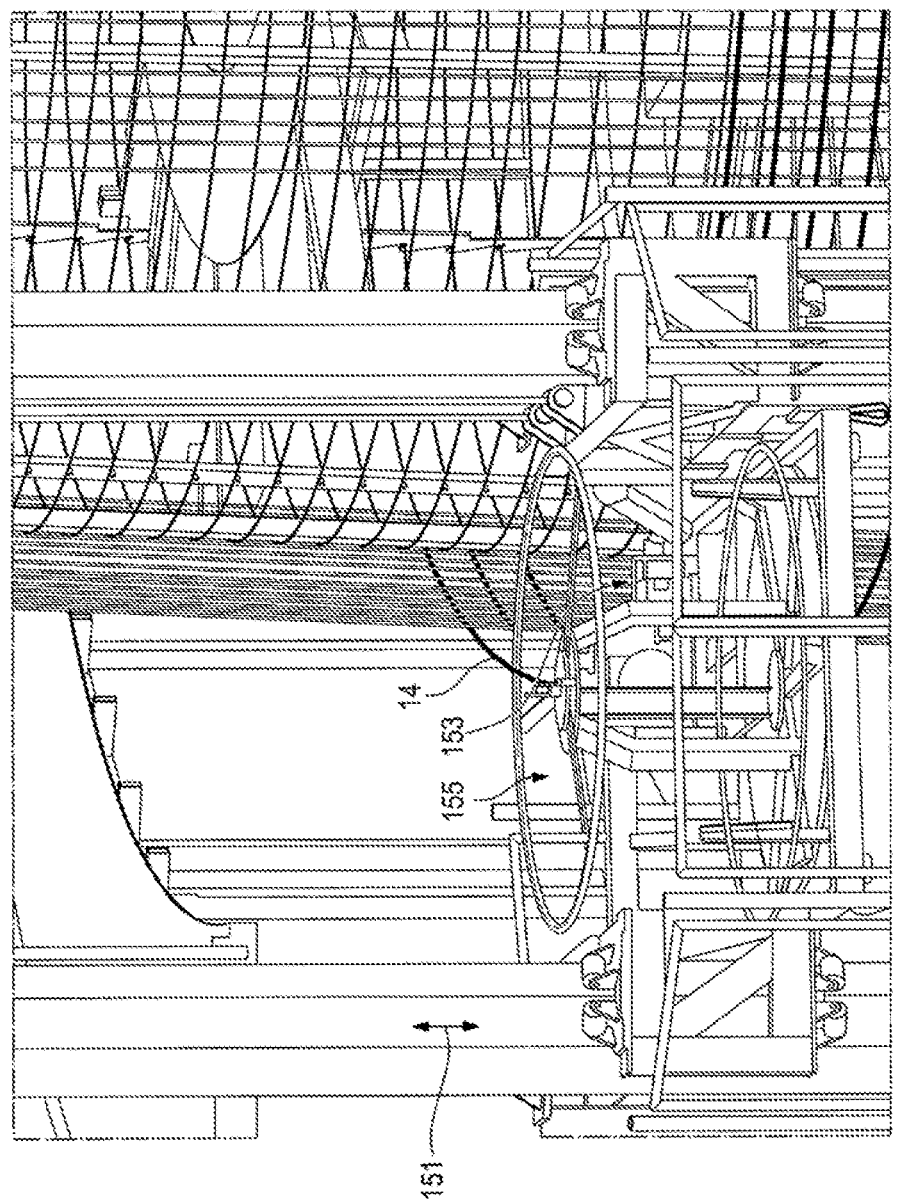

Connecting means is one of:
- an adhesive dispensing device,
- a welding device,
- a soldering device, and
- a device for automatically twisting metal

Fig. 7

INSTALLATION FOR PRODUCING REINFORCEMENT CAGES FOR TOWER SEGMENTS OF WIND TURBINES

BACKGROUND

Technical Field

The present invention relates to a system for producing reinforcing cages for wind turbine tower segments, wherein a reinforcing cage has in each case substantially horizontally oriented ring segments and substantially vertically oriented stiffening elements.

Description of the Related Art

Towers such as those which are used, inter alia, for wind turbines often have a wall made from concrete or reinforced concrete. In particular in the case of dynamically loaded towers, which applies to the majority of towers owing to the effect of the wind, stiffening structures, so-called reinforcing cages, are additionally provided inside the tower wall in order to improve stability. A tower hereby has a segmental structure, i.e., a tower is composed of multiple superposed ring-shaped tower segments.

In the production of such tower segments, the reinforcing cage is first produced and concrete is then poured into formwork provided for this purpose and left to set.

In known devices for producing reinforcing cages for tower segments, a support structure is provided which holds a plurality of bars, so-called rakes. These bars each have holders for holding reinforcing steel wire, wherein the reinforcing steel is passed around the support structure or the support structure is set in rotation in order to form ring elements. These ring elements are connected to bracket-like (steel) stiffening elements which extend substantially perpendicularly to the rings or substantially vertically, as a result of which a grid-like reinforcing cage is formed.

The reinforcing steel wire is either passed around a stationary support structure in a circular motion or, which is preferable, is situated in a stationary feed unit and is pulled out of the holder by the support structure which can be driven in rotation and is applied around the support structure owing to the rotational motion of the latter. During the whole time, the shape of the ring-shaped steel strands is stabilized by the support structure and the bars by means of multiple spokes which extend between the support structure and the bars. In order to remove the reinforcing cages from the device, in known systems the spokes must each be removed or the stabilizing bars are unhooked individually and manually from the finished cage.

Depending on the size of the tower segments to be produced, the reinforcing cages already have a considerable weight and, depending on the tower segment, sizable dimensions. A reinforcing cage has, for example, for the lowest, i.e., largest tower segment of a type E126 wind turbine from the ENERCON company, a diameter of approximately 14 m, a height of approximately 3.7 m and a weight of approximately 8.5 t. Because of its grid-like structure and the enormous dimensions, during manufacture reinforcing cages can only be handled with difficulty using conventional crane systems.

A gripping device for handling such reinforcing cages is known from DE 10 2012 221 453.

As well as handling the reinforcing cages, in the known manufacturing environments there is, however, a need to design the connection of the substantially vertical elements to the substantially horizontal ring elements of the reinforcing cages more efficiently and at the same time to be able to handle them using the known gripping device referred to above.

BRIEF SUMMARY

One or more embodiments provide a system of the type described at the beginning which ensures efficient production of the reinforcing cages. In particular, the invention is also to be able to use said system in combination with, for example, the above-described known gripping device.

Provided is a system having:
- a receiving area which is adapted so as to receive the preferably inner, substantially horizontally oriented ring segments of the reinforcing cage,
- a first handling robot for supplying the stiffening elements, and
- a second handling robot for connecting the ring elements to the stiffening elements.

By using a first and a second handling robot, the number of manual work steps can be reduced, overall working safety is increased, and improved work planning is enabled. It has surprisingly proven to be the case that, despite the complex structure of the system and the many degrees of freedom during operation, it is possible to produce reinforcing cages in an efficient manner in terms of time.

The invention is preferably further developed by the system having an electronic control unit which is configured so as to control the first and second handling robots for supplying the stiffening elements in a coordinated manner and for connecting the stiffening elements to the ring elements. To do this, the electronic control unit preferably has one or more computer-assisted workstations which are configured so as to import and process a virtual representation of the reinforcing cage to be produced and of the system producing the reinforcing cage, including the handling robots. The virtual representation can be supplied in the form of CAD data and/or CAD/CAM data. Data sets which link a specific movement pattern of the handling robots to a respective type of reinforcing cage to be produced are preferably stored in the electronic control unit. Reinforcing cages have different sizes depending on which tower segment they are to be used for. The sizes can, for example, be stored in data memories and the electronic control unit is preferably configured so as to access them, read the corresponding data sets and convert them into operating instructions for the first and second handling robots.

In a preferred embodiment of the invention, the receiving area is arranged on a rotatable platform. The first and second handling robots are preferably arranged in a fixed location adjacent to the platform and/or can preferably be adjusted radially with respect to the center point of the platform. Because the handling robots are arranged adjacent to the preferably rotatable platform, an improved gain in space is obtained for the production site. Reinforcing cages for tower segments have a substantially cylindrical or frustoconical design so that rotation of the reinforcing cages on the receiving platform does not require any additional space in any direction.

According to a further preferred embodiment, the receiving area is configured in order to interact with a gripping device for handling a reinforcing cage. The gripping device is preferably designed according to DE 10 2012 221 453.

The first handling robot is furthermore preferably configured so as to bring the stiffening elements to bear against the ring elements in a substantially vertical orientation. It is hereby irrelevant if individual ring elements are not brought to bear against the stiffening elements. The crucial thing is that the stiffening elements and ring elements which are brought to bear with one another are those where a connection is subsequently to be effected by the second handling robot at the points where they meet. According to the invention, the phrase "substantially vertical" is also understood to mean at such an angle of inclination to the vertical as can arise from an oblique helical path, for example in the region of ±1 to 10°.

Different types of stiffening elements can be formed in order to become part of the reinforcing cage. According to a first aspect, the stiffening elements are formed from a helically bent endless material. The stiffening elements are particularly preferably formed from a single helically bent steel wire that runs around the complete circumference of the ring elements. This structure is also called an upright helix. Such a design of the stiffening elements has the advantage that a bending and welding device for supplying the stiffening elements that is separate and hence has associated transport costs can be dispensed with.

The first handling robot is preferably configured so as to form and arrange this structure along the substantially horizontal ring elements.

According to a preferred embodiment, the first handling robot has bending means and interacts with a feed unit which feeds the endless material to the bending means, wherein the bending means are configured so as to bend the fed endless material in such a way that the stiffening means are formed helically.

The bending means preferably have deflecting rollers between which the endless material is passed, wherein the positions of the deflecting rollers relative to one another can be modified. The positions of the deflecting rollers relative to one another can be modified in such a way that different bending radii and bending directions can be introduced into the endless material.

The arrangement of the deflecting rollers can, for example, take the form of tube bending tools.

In another preferred embodiment, the bending means are arranged so as to be stationary on the cage production system, wherein a handling robot preferably does not undertake the bending itself but only the handling of the bent reinforcing steel.

According to a second aspect of the invention, the stiffening elements are designed as separate, preferably closed brackets. This design has the advantage that the arrangement of the individual stiffening elements around the ring elements can be handled in a more flexible manner and the handling process can be managed more simply. In the design according to this aspect of the invention, the stiffening elements are prefabricated in a separate production process and then held in stock in large quantities.

In a preferred embodiment, the first handling robot has gripping means for non-slip grasping and removal of the stiffening elements from a stocking unit. Non-slip is hereby understood to mean that the gripping means grip the stiffening elements either in an interlocking fashion or force-locking fashion in such a way that, taking into account the acceleration to be expected when the handling robots move, static friction occurs between the gripping means and the stiffening elements but dynamic friction does not, and of course the gripping means also do not release the stiffening elements.

The gripping means are preferably configured so as to grip the stiffening element at opposite ends of the stiffening element in each case on the inside of at least one corner.

According to a further preferred embodiment, the gripping means have a first and second pivotable coupling link which is configured so as to grip the stiffening element in each case at at least one corner by means of pivoting.

The coupling links preferably each have a guide roller for gripping the stiffening elements, preferably on the inside, at a corner, and preferably a supporting section or a further roller at an opposite end of the coupling link. The supporting section or the further roller are preferably each arranged in such a way that, when the coupling link is pivoted, a sufficient spreading force is exerted on the stiffening element to allow the first handling robot to lift, lower and displace the stiffening element in a non-slip manner.

According to a further preferred embodiment of the invention, the second handling robot has a pivotable working head on which a connecting means is arranged which is selected from a list consisting of:
adhesive dispensing device,
welding device,
soldering device,
device for automatically twisting metal wires.

The device for automatically twisting metal wires is preferably designed as known from DE 10 2012 216 831.

The above embodiments have each referred to ring elements generally. They can be understood as a first set of ring elements when, in a preferred embodiment, the system has a third handling robot for supplying a second set of substantially horizontally oriented, preferably outer ring elements, wherein the ring elements are designed as separate, preferably closed rings or are designed as helically bent endless material. The electronic control unit is preferably likewise configured so as to also control the third handling robot in a coordinated fashion with the first and second handling robots, in particular based on a corresponding virtual representation.

The third handling robot preferably has a guide device, preferably with one or more guide rollers, and interacts with a feed unit which feeds the endless material to the guide device, wherein the guide device is configured so as to guide the fed endless material in such a way that the second set of ring elements has a helical design.

The second handling robot is preferably moreover configured so as also to connect the second set of ring elements to the stiffening elements.

The electronic control unit is preferably configured so as to control the second and third handling robots, preferably all the handling robots of the system, in order to supply in a coordinated fashion the second set of ring elements and to connect the stiffening elements to the second set of ring elements. Reference is hereby preferably made to the same means and resources as with respect to the first and second handling robots.

BRIEF DESCRIPTION OF THE SEVERAL VIEWS OF THE DRAWINGS

The invention is explained in detail below with the aid of preferred exemplary embodiments and with reference to the attached drawings, in which:

FIGS. 3a-3c show different schematic partial views of a system according to a second exemplary embodiment, FIGS. 4a-4c show different schematic partial views of a system according to a third exemplary embodiment, FIGS. 5a and 5b show different working positions and schematic partial views of a third handling robot as examples for the second exemplary embodiment, FIG. 7 is diagram of the different connecting means.

DETAILED DESCRIPTION

Figure 1A:
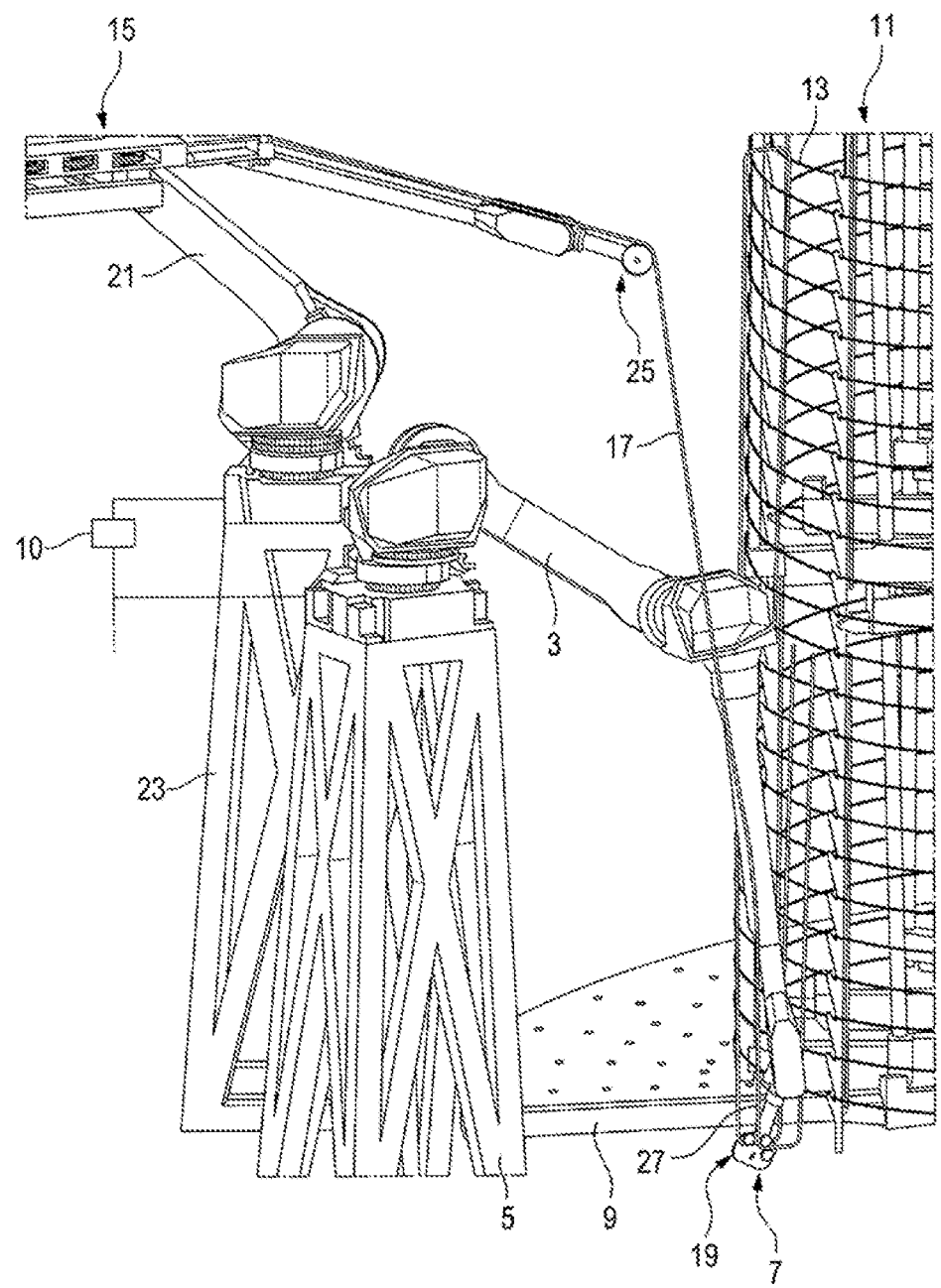
FIGS. 1a and 1b show a schematic partial view of a system according to a first exemplary embodiment.

A system 1 according to a first exemplary embodiment of the invention is shown in FIG. 1a. The system 1 has a first handling robot 3 which is designed to form helically arranged stiffening elements 27 by means of corresponding bending means. The first handling robot 3 has a working head with a bending device 19. The first handling robot 3 is arranged in FIGS. 1a and 1b on a support structure 5. This can be a pedestal as in FIGS. 1a and 1b or another support structure, as shown for example in one of the other exemplary embodiments.

The system 1 has a receiving area 7. The receiving area 7 is configured so as to receive a gripping device 11. The gripping device 11 has coupling means, for example in the form of hook-shaped rake arms on which substantially horizontally oriented ring elements 13 are arranged in each case. The receiving area 7 is arranged on a preferably rotatable platform 9. The platform 9 is preferably connected to an electronic control unit by a data line so that the rotation can be effected in a coordinated fashion by means of the electronic control unit, depending on the progress of the work of the handling robots 3 and 21.

The first handling robot 3 is connected, inter alia, to a feed unit 15 by means of an electronic control device and interacts with the feed unit 15 so that the latter can feed to the handling robot 3 an endless material 17 to produce the helical stiffening elements 27.

The system 1 moreover has a second handling robot 21 which has a working head 25 with a connecting means, for example in the form of a welding wheel. The second handling robot 21 is preferably likewise connected to the electronic control unit and interacts in a coordinated fashion with the first handling robot 3 and the platform 9 in order to connect the generated stiffening elements 27 to the substantially horizontally oriented ring elements 13 which are held by the gripping device 11. The second handling robot 21 can be arranged, for example, on a support structure 23, adjacent to the receiving area 7, or on an alternative support structure together with the first handling robot, as shown for example in the following exemplary embodiments.

Figure 1B:
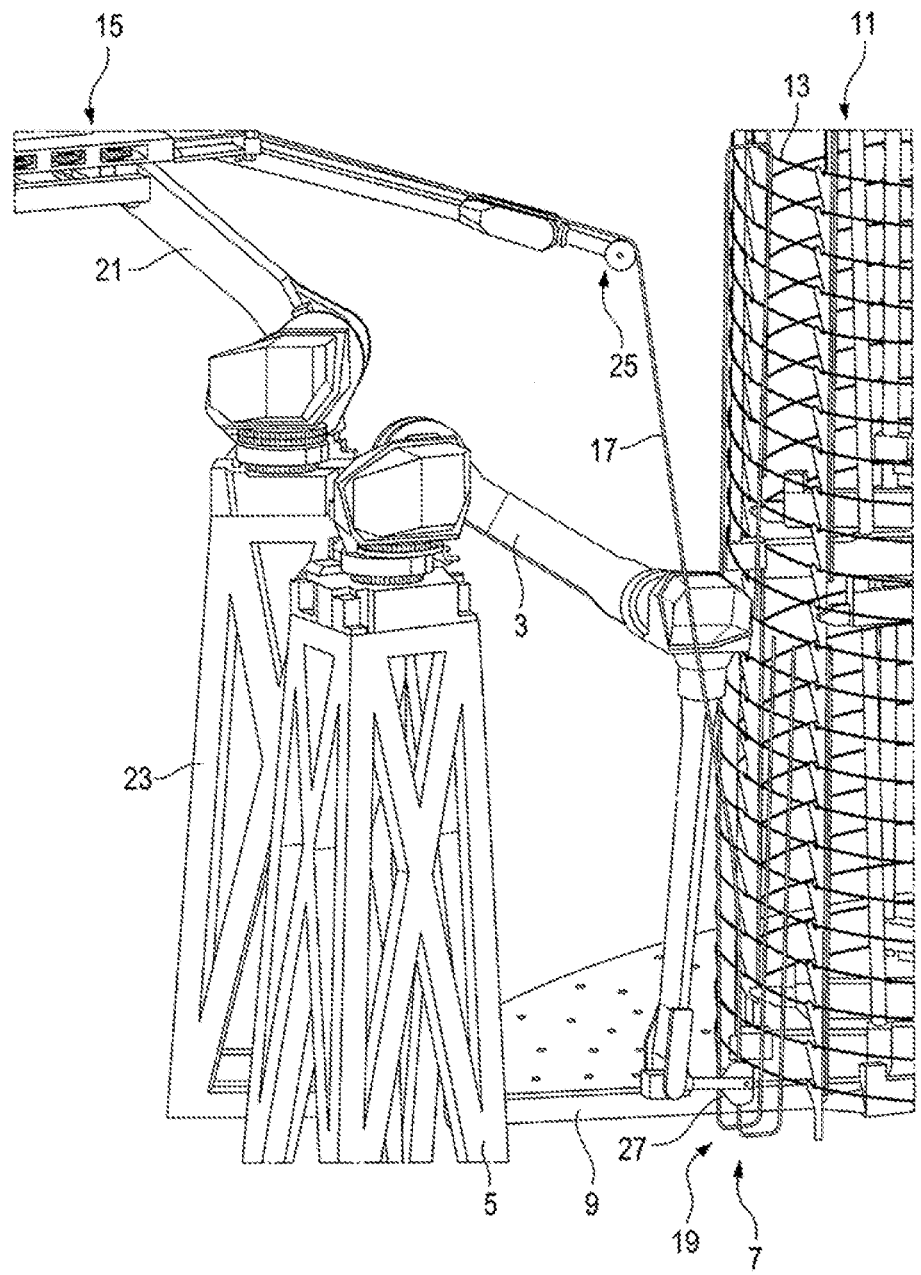

The first handling robot 3 can move along multiple axes in order to enable the working head 19 to generate bends in the endless material 17 in such a way that the substantially vertically oriented stiffening elements 27 are formed. For this purpose, the working head 19 can also be reconfigured and repositioned, as shown in FIG. 1b, and in particular as is illustrated in detail in FIGS. 2a to 2g.

The system moreover has an electronic control device 10 for controlling the handling robots 3, 21 on the platform 9 in a coordinated fashion.

A portion of the system 1 according to the first exemplary embodiment is shown in FIGS. 2a to 2g, in which the working head 19 of the first handling robot 3 is shown in operation. In the Figures, a first substantially vertically oriented stiffening element 27 has already been created, adjoining the ring elements 13 in the receiving area 7. The working head 19 has a base body 29 on which multiple deflecting rollers 31a, 31b, 31c (FIGS. 2c to 2g) are arranged. A first bend for a stiffening element 27 has been generated in FIG. 2a. Starting from the situation in FIG. 2a, in FIG. 2b the endless material 17 is deformed further by adding a further bend. To do this, the first handling robot 3 has performed a corresponding pivoting motion about a working axis b. In order to complete the bending of the endless material 17, the first handling robot 3 briefly withdraws from the situation in FIG. 2b and pivots the body of the handling robot 3 outwards so that the first handling robot 3 does not collide when the endless material 17 is then guided upwards to the point at which the next bend which needs to be made.

The working head 19 of the first handling robot 3, formed by bending means in the form of a bending device, has adjustable deflecting rollers 31a, 31b, 31c which are arranged on the base body 29. An example of altering the position of the rollers, in conjunction with a repositioning motion of the working head 19, is illustrated in FIGS. 2c to 2g.

Figure 2A:
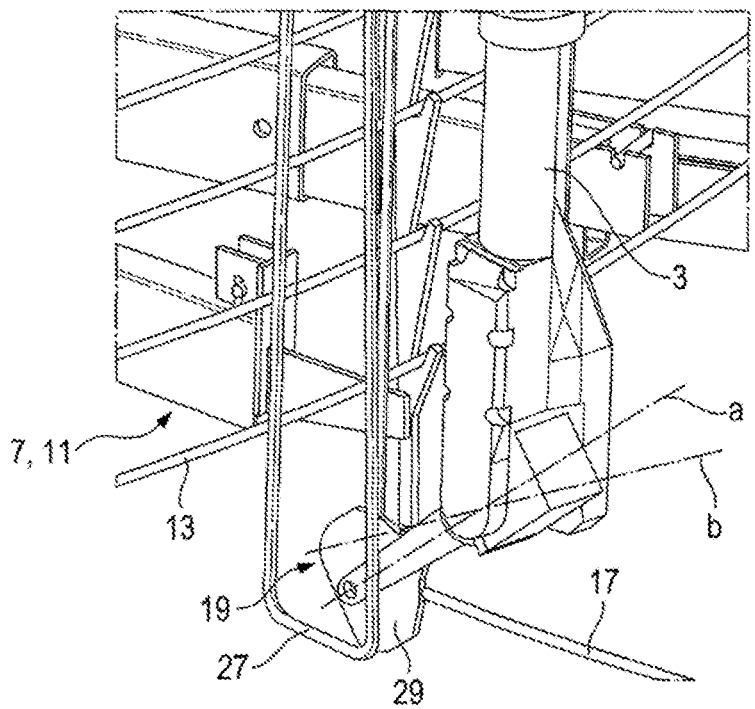
FIGS. 2a-2g show different working positions of the first handling robot according to the first exemplary embodiment.
Figure 2B:
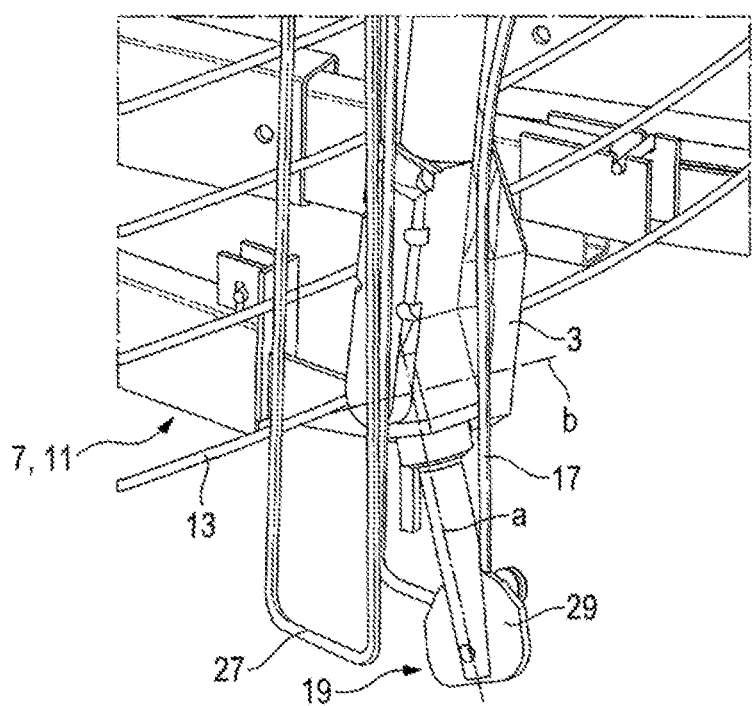
Figure 2C:
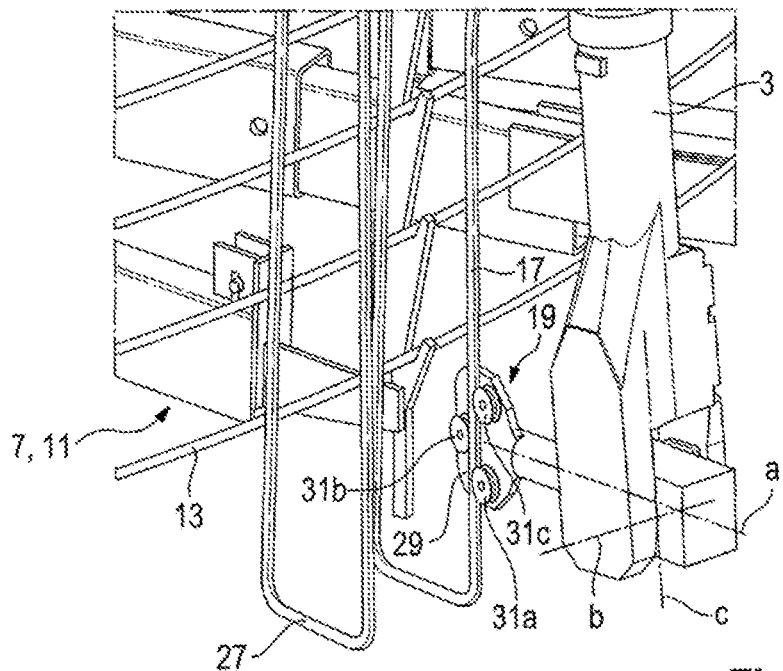
Figure 2D:
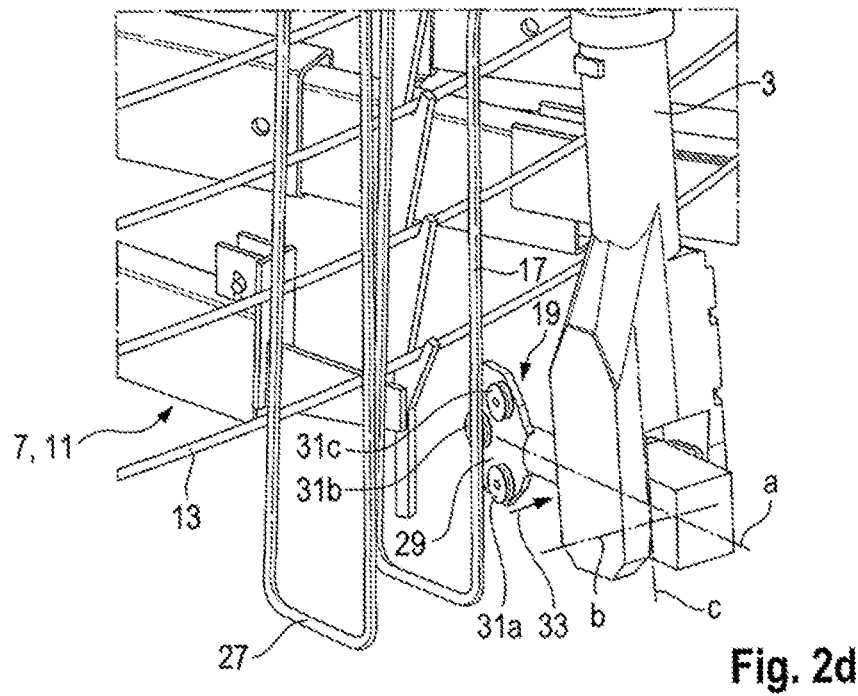
Figure 2E:
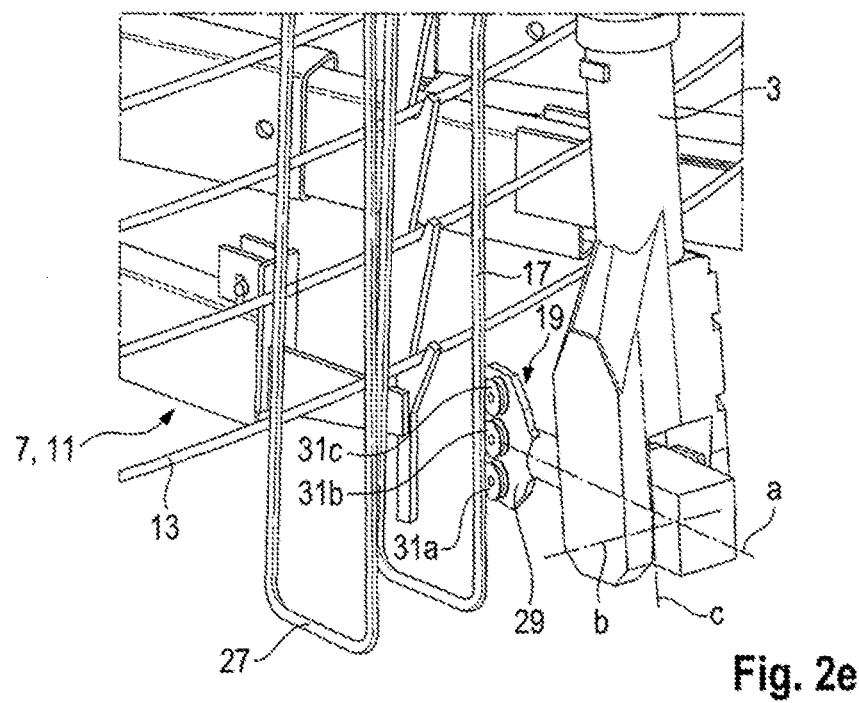
Figure 2F:
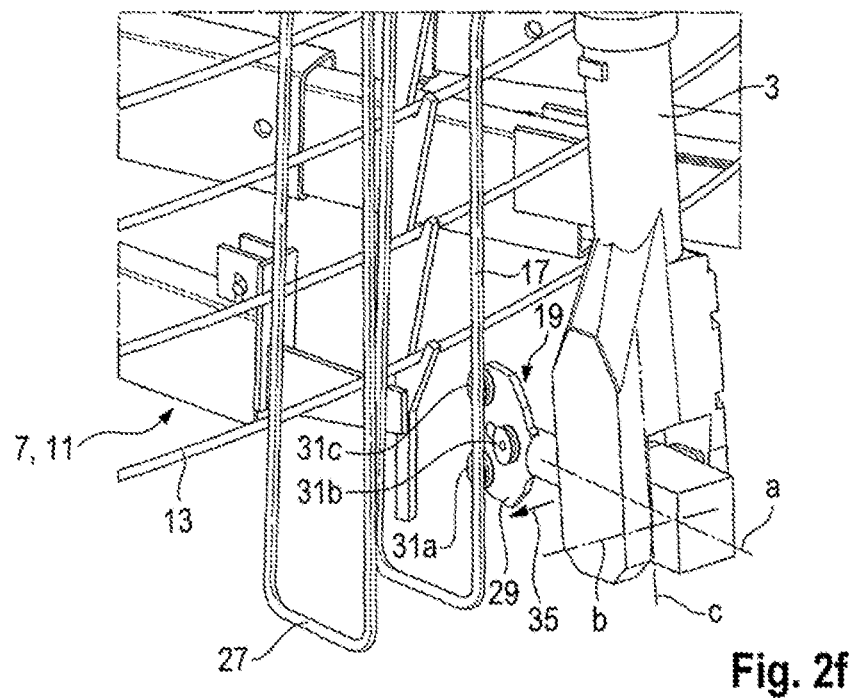
Figure 2G:
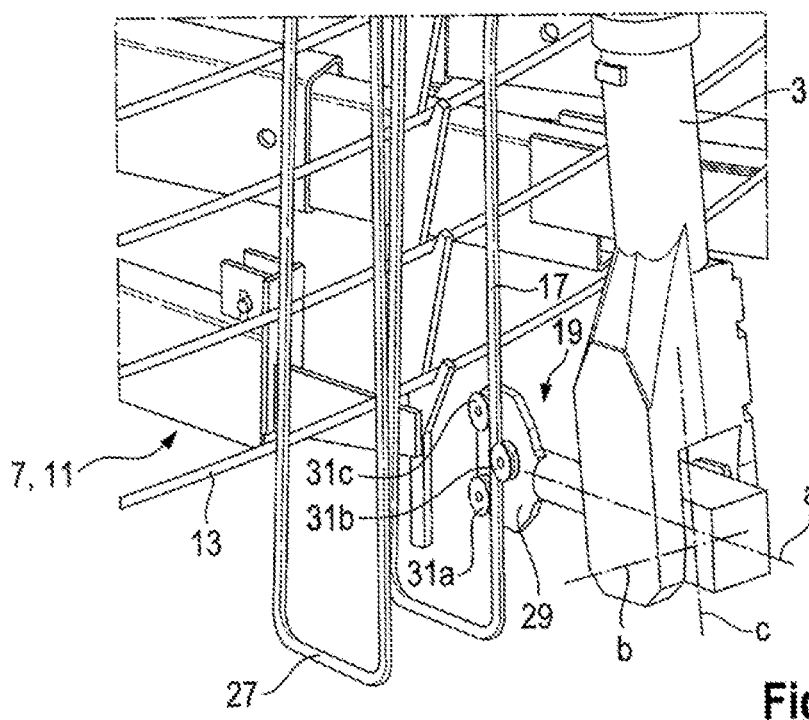

In Figure c, the working head 19 on the first handling robot 3 is initially still situated in engagement with the endless material 17. In order to prevent twisting of the endless material 17 using the handling robot 3, in FIG. 2d the working head 19 is pivoted about an axis c on the first handling robot 3 in the direction of the arrow 33 so that the rollers 31a, 31b, 31c are brought out of engagement with the endless material 17. Then, as can be seen in FIG. 2e, the positions of the rollers 31a and 31c are altered in a first direction, whilst the deflecting roller 31b arranged between the deflecting rollers 31a, 31c is shifted in the opposite direction. The deflecting rollers 31a, 31b, 31c can be repositioned either steplessly or according to a pattern, for example by moving them into dedicated openings. Once the repositioning is complete, as shown in FIG. 2f, the working head 19 is pivoted again about the axis c in the direction of the arrow 35 so that the deflecting rollers 31a, 31b, 31c are again in engagement with the endless material 17. This situation is depicted in FIG. 2g. In FIGS. 2c to 2g, the rotated position of the base body 29 relative to the first handling robot 3 is constant. It is, however, optionally also possible to pivot the base body 29 of the working head 19 about an axis a, as can be seen, for example, by comparing FIG. 2b with FIG. 2c.

Figure 3B:
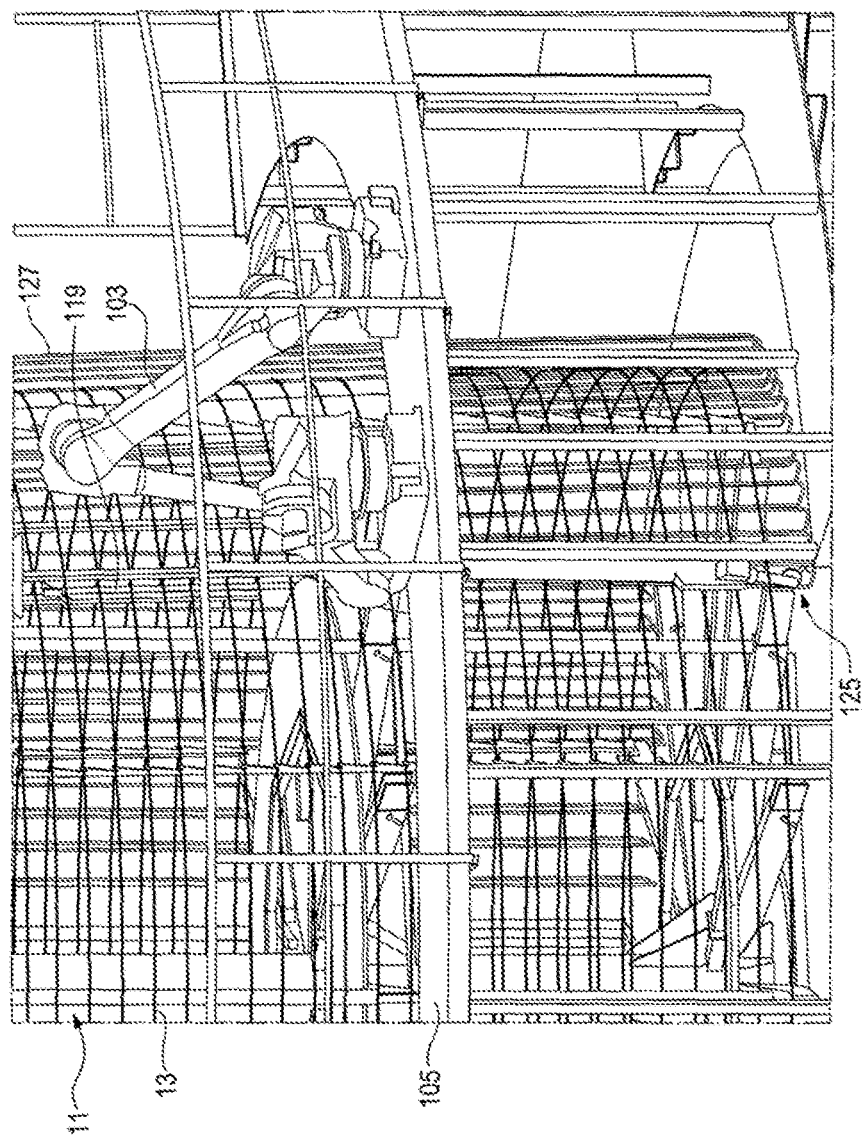

FIGS. 3a and 3b show schematically a portion of a system 100 according to a second exemplary embodiment of the invention. The essential features are the same as in the first exemplary embodiment. In particular, the type of arrangement of a first handling robot 103 of the system 100 and a second handling robot 121 of the system 100 can in principle be swapped or combined with the type of arrangement for the system 1. On its working head 119, the first handling robot 103 of the system 100 has a gripping device by means of which the handling robot 103 can grip stiffening elements 127 on the inside and hold them in a non-slip fashion. The stiffening elements 127 according to the second exemplary embodiment are separate, preferably closed brackets. The first handling robot 103 is designed to remove the bracket-like stiffening elements 127 from a stocking unit using the working head 119 designed as a gripping device, bring them to bear against the ring elements 13 on the gripping device 11 of the system 100, and hold them there until the second handling robot 121 has connected the stiffening elements 127 to the ring elements 13 using its working head 125 designed as a welding device, for example as a welding wheel. In FIGS. 3a and 3b, the first handling robot 103 and the second handling robot 121 are arranged on an annular platform 105 surrounding the gripping device 11 and the (not shown) rotatable platform 9 (FIG. 1a). However, support structures like those for example in FIGS. 1a and 1b could also be chosen, in exactly the same way as a support structure like the platform 105 depicted here could be chosen in the first exemplary embodiment of the system 1 in FIGS. 1a and 1b.

The precise design of the stocking unit is not shown in this exemplary embodiment for reasons of clarity. It can, for example, be a stocking unit like the stocking unit 204 from the exemplary embodiment of FIGS. 4a to 4c explained below.

Figure 3C:
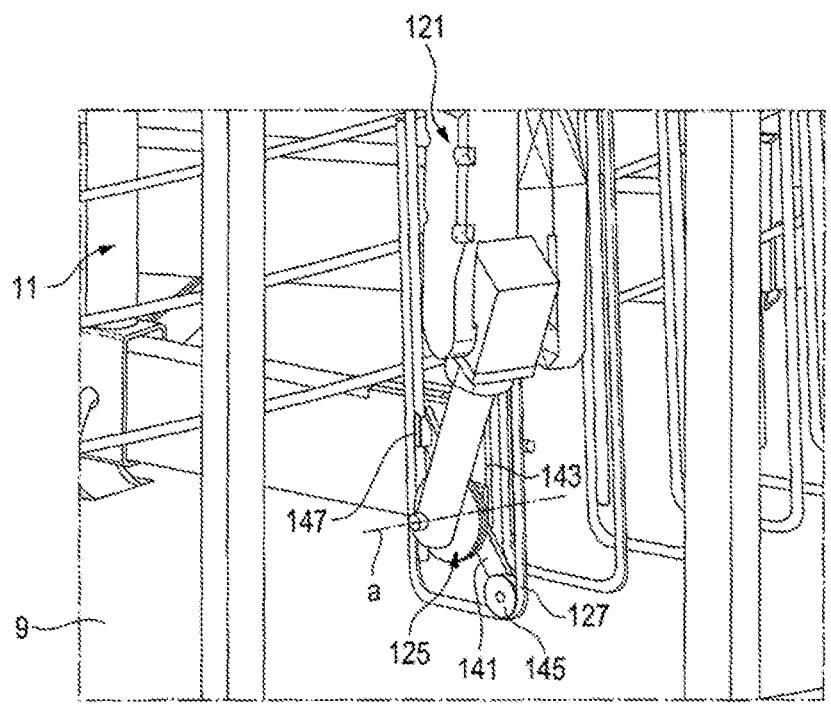

In the situation in FIG. 3a, the second handling robot 121 is positioned in such a way that a stiffening element 127 is connected to one of the ring elements 13 in the upper area of the reinforcing cage to be created. On the other hand, in FIG. 3b the second handling robot 121 is positioned such that the working head 125 can connect the stiffening element 127, in a lower area of the reinforcing cage to be produced, to a ring element in the gripping device 11, or alternatively effects a weld on the stiffening element 127 itself. During these processes, the first handling robot 103 holds the stiffening element 127 in position in a non-slip manner. This happens by means of pivotable coupling links which are arranged at opposite ends of the working head 119. FIG. 3c shows the coupling link 141, although it is covered by the working head 125 of the second handling robot 121. The coupling link with its component parts is likewise also explained in greater detail in an exemplary embodiment which is still to be discussed below.

The coupling link 141, which can be seen in FIG. 3c, has at its first end a guide roller 145 which is configured so as to be inserted into the bend, and therefore the corner, of a stiffening element 127 and to grasp the stiffening element there. At the opposite end of the coupling link 141 from the guide roller 145, a support section 147 is arranged which is configured so as to exert, when the coupling link 141 is pivoted together with the guide roller 145, a spreading force on the stiffening element 127 which is great enough to be able to hold the stiffening element 127 in a non-slip manner.

The coupling link 141 can preferably be displaced by means of an actuator 143.

A system 200 for producing reinforcing cages according to a third exemplary embodiment is shown in FIGS. 4a to 4c. The third exemplary embodiment is very similar in structure to the second exemplary embodiment so reference is only made to structural differences. In contrast to the system 100, the system 200 has a height-adjustable portal 206 on which a second handling robot 221 is arranged so that its height can be altered. A first handling robot 203 is mounted on a support structure 205 separately from the second handling robot 221. The system 200 has a stocking unit 204 for stiffening elements 127. The first handling robot 203 is configured so as to remove these stiffening elements 127 from the stocking unit 204 and place them against the ring elements 13 which are held on the gripping device 11 and are arranged in the receiving area 7 on a rotatable platform 9. This removal process is shown by way of example in FIG. 4a. In FIG. 4b, which shows the same system 200 from FIG. 4a from a different point of view, the first handling robot 203 has brought a previously removed stiffening element 127 to bear against the ring elements 13 on the gripping device 11. Starting from the operating situation in FIG. 4b, the second handling robot 221 is configured so as to shift heightwise along the portal 206 to the appropriate point and then bring a working head 225 into position, which creates a connection of the stiffening element 127 in each case to a section of a ring element 13 at different heights along the reinforcing cage which is to be produced.

In the exemplary embodiments shown hereabove, the substantially horizontally oriented ring elements 13 were the ring elements for a so-called internal helix of the reinforcing cage to be produced. It is likewise within the scope of the invention that these ring elements represent a so-called external helix, wherein the stiffening elements could then be arranged on the inside with respect to these ring elements. Not all combinations of corresponding shifts of the positions of the handling robots are shown here in order to make the view clear.

In order to remain within the above-described exemplary embodiment of an internal helix for the substantially horizontally oriented ring elements 13, it is provided within the scope of a further exemplary embodiment, which is to be understood as a supplement to all the exemplary embodiments shown above, but by way of example is only illustrated with the aid of the exemplary embodiment from FIGS. 3a to 3c, that the substantially horizontally oriented ring elements 13 represent a first set of ring elements. In FIGS. 5a and 5b, an automatic winding unit 150 is additionally provided in the system 100, which is configured so as to supply a second set of substantially horizontally oriented ring elements 14 on an opposite side of the stiffening elements 127 (or also of the helically formed stiffening elements 27 in the first exemplary embodiment) with respect to the first set of ring elements. In the exemplary embodiment shown in FIGS. 5a and 5b, the winding unit 150 has a guide device 153 which is configured so as to apply endless material, which can be the same endless material for the helically formed stiffening elements 27 of FIGS. 1a to 2g, annularly or spirally around the stiffening elements 127. To do this, the winding unit 150 is shifted heightwise on a portal 151 whilst the platform 9 is rotated about a vertically oriented axis e together with the gripping device 11, the ring elements 13 and the stiffening elements 127. As can be seen from FIG. 5b, the endless material is preferably supplied by a feed device in the form of a stocking unit 155 which can hold ready a cylindrical spool of the endless material. The guide device can have multiple guide rollers which allow the endless material to be dispensed in a specific fashion in order to form the rings 14. The winding unit 150 is preferably connected via a data line to a central electronic control unit, for example the one mentioned above, which coordinates the work of the different system components such as the handling robots, winding unit and rotatable platform. This control unit is indicated in FIG. 1a.

The winding unit which is shown in FIGS. 5a and 5b can, for example, also be the feed device 15 which is used in the exemplary embodiment of FIGS. 1a to 2g in order to supply the endless material 17.

Figure 6A:
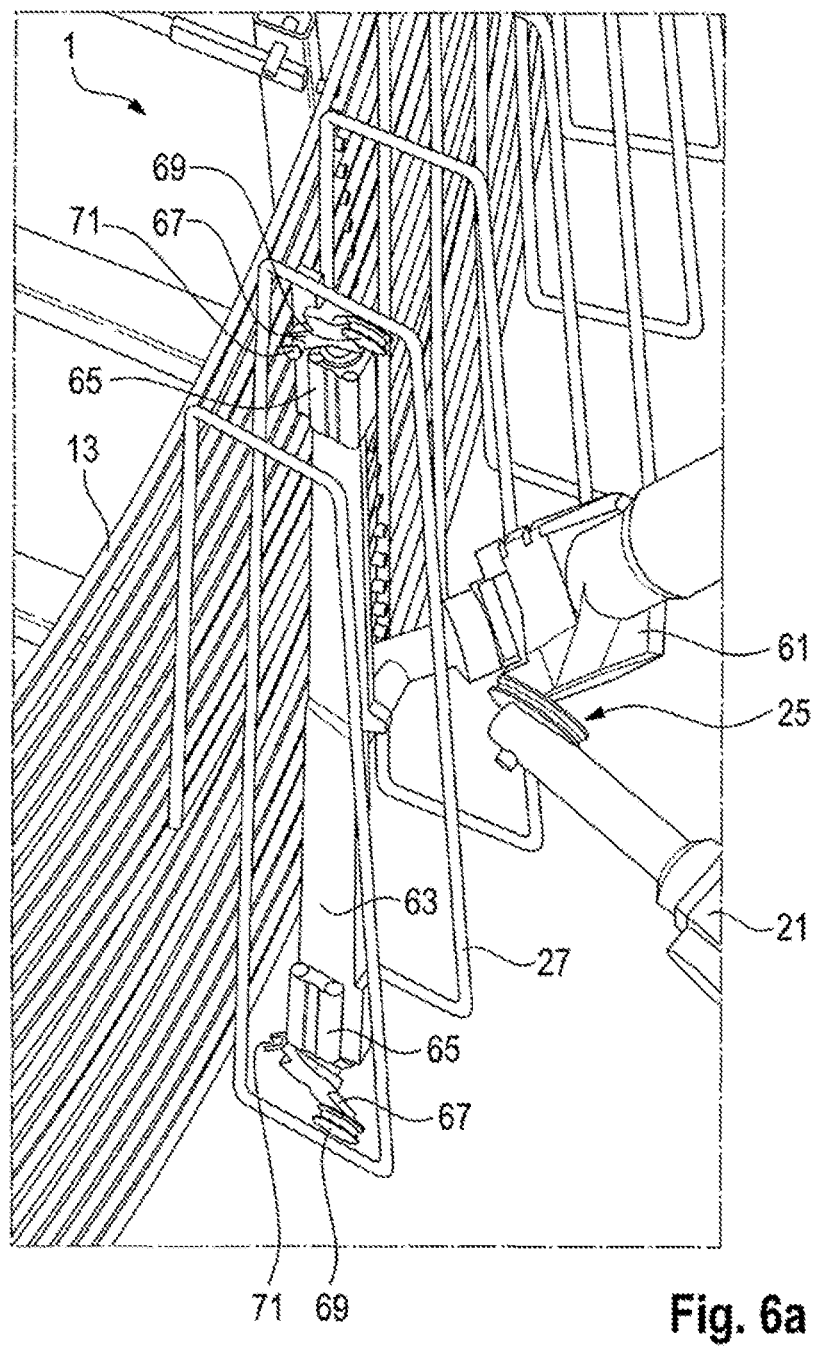
FIGS. 6a-6c show different working positions of a further handling robot for a system according to one of the exemplary embodiments, illustrated as examples of the first exemplary embodiment.
Figure 6B:
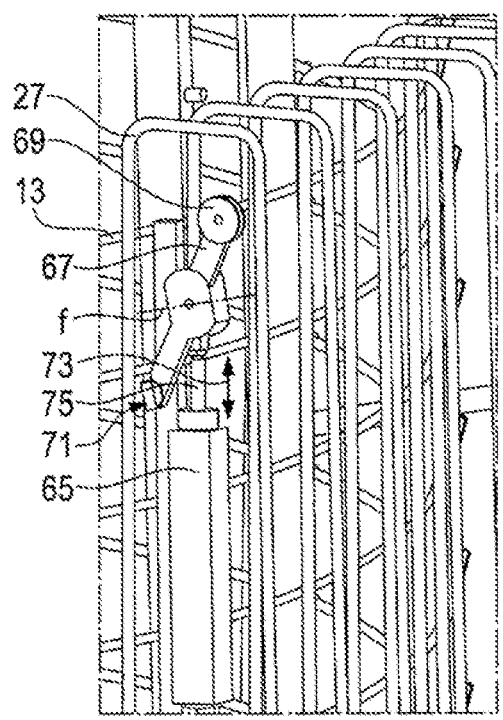
Figure 6C:
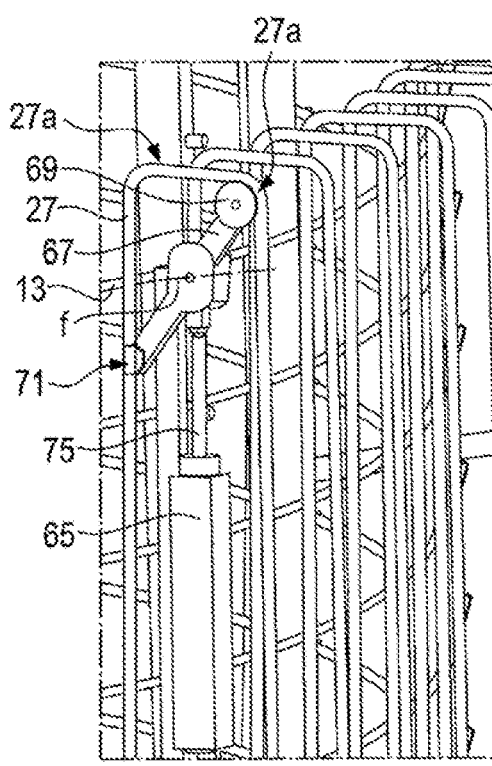

An additional option for a combination of features, given by way of example, of the above-described different exemplary embodiments in FIGS. 6a to 6c is described below with reference to a further exemplary embodiment. The system 1 according to the exemplary embodiment from FIGS. 1a to 2g preferably has a further handling robot 61. The handling robot 61 in particular has an identical design to the first handling robot 103 from the exemplary embodiment of FIGS. 3a to 3c. Although there is no need to supply prefabricated stiffening elements from a stocking unit in the system 1, this handling robot 61 can also advantageously be used in the system 1 by it engaging in the already formed helical stiffening elements 27 in order to stabilize them and hold them in a non-slip manner until the second handling robot 21 has carried out the necessary work of connecting the stiffening elements 27 to the ring elements 13.

In FIGS. 6b to 6c, further details are shown with respect to the working head 63 of the handling robot 61, visible in FIG. 6a and designed as a gripping device, which, to simplify the drawing, were omitted in the case of the working head 119 from the exemplary embodiment of FIGS. 3a to 3c and similarly in the exemplary embodiment of FIGS. 4a to 4c. The coupling device, which has the reference numeral 67 instead of 141, is arranged on the working head 63 so that it can be shifted by means of an actuator 65. The supporting section now has the reference numeral 71 and the guide roller the reference numeral 69. The operating mode of the coupling link is shown by way of example in FIGS. 6b and 6c. The gripping device 63 is first brought into the situation shown in FIG. 6a. In this situation, the coupling link 67 shown in FIG. 6b is situated in the "internal area" of a corner of a spiral of the stiffening elements 27. From this position, a piston rod 75 is extended in the direction of the arrow 73 by means of the actuator 65.

According to FIG. 6c, this has the consequence that the guide roller 69 of the coupling link comes to bear against an end area 27a of the stiffening element 27 and, when the piston rod 75 continues to move, rolls in the direction of one of the corners caused by the bending. In FIG. 6c, the guide roller 69 has reached the corner 27b caused by the bending. The piston rod 75 is displaced so far by means of the actuator 65 that the supporting section 71 arranged at the opposite end of the coupling link 67, with respect to the guide roller 69, bears against an substantially vertical section 27c of the stiffening element 27. In this position, the actuator 65 is, by virtue of the piston rod 75 being pushed out further, capable of exerting a spreading force on the stiffening element 27 by means of which the latter is fixed and stabilized. In this position, it is possible for the stiffening elements directly adjacent to the held stiffening element 27, and including the stiffening element 27 itself, to be connected by the second handling robot 21.

For the sake of clarity, a spring return for the coupling link and different sensor means which are part of the system equipment and assist error-free and collision-free operation of the system have not been shown.

As is apparent from the above embodiments, features which are shown in the respective exemplary embodiments can be combined with one another so that different system components from the different exemplary embodiments can be used to form a common system in a common exemplary embodiment.

The invention claimed is:

1. A system for producing reinforcing cages for wind turbine tower segments, wherein each reinforcing cage has substantially horizontally oriented ring elements and substantially vertically oriented stiffening elements, the system comprising:
    a receiving area adapted to receive the ring elements;
    a first handling robot configured to supply and position the stiffening elements, wherein the first handling robot is configured to bring the stiffening elements to bear against the ring elements in a substantially vertical orientation; and
    a second handling robot configured to connect the ring elements to the stiffening elements,
    wherein the stiffening elements are formed from a helically bent endless material,
    wherein the first handling robot has bending means and interacts with a feed unit that feeds the endless material to the bending means, and
    wherein the bending means in configured to bend the endless material in such a way that the stiffening elements are formed helically.

2. The system according to claim 1, comprising an electronic control unit configured to control the first and second handling robots for supplying the stiffening elements in a coordinated manner and for connecting the stiffening elements to the ring elements, respectively.

3. The system according to claim 1 wherein the receiving area is arranged on a rotatable platform.

4. The system according to claim 3 wherein the first and second handling robots are arranged adjacent to the platform.

5. The system according to claim 1 wherein the receiving area is configured to interact with a gripping device for handling one of the reinforcing cages.

6. The system according to claim 1 wherein the bending means are deflecting rollers, wherein the endless material is configured to be passed between the deflecting rollers, and wherein the deflecting rollers are adjustable such that positions of the deflecting rollers relative to one another can be modified.

7. The system according to claim 6 wherein the deflecting rollers are provided to a pivoting working head.

8. The system according to claim 1 wherein the first handling robot undertakes handling of bent steel wires.

9. The system according to claim 1 wherein the second handling robot has a pivotable working head and a connecting means is arranged on the pivotable working head, wherein the connecting means is selected from a list consisting of:
    an adhesive dispensing device,
    a welding device,
    a soldering device, and
    a device for automatically twisting metal wires.

10. The system according to claim 1 wherein the ring elements in the receiving area are a first set of ring elements and the system has an automatic winding unit for supplying a second set of substantially horizontally oriented, ring elements, wherein the ring elements of the second set are designed as helically bent endless material.

11. The system according to claim 10 wherein the automatic winding unit has a guide device and interacts with a feed unit that feeds the endless material for the second set of rings to the guide device, and wherein the guide device is configured to feed the endless material in such a way that the ring elements are formed helically.

12. The system according to claim 11, comprising an electronic control unit configured to control all handling robots of the system, and wherein the handling robots, the feed units and a rotatable platform are configured to supply the ring elements and stiffening elements and to connect the stiffening elements to the ring elements.

13. The system according to claim 10 wherein the second handling robot is configured to connect the second set of ring elements to the stiffening elements.

14. The system according to claim 10 wherein the second set of substantially horizontally oriented, ring elements are outer ring elements.

* * * * *